US010270935B2

(12) United States Patent
Singh et al.

(10) Patent No.: US 10,270,935 B2
(45) Date of Patent: Apr. 23, 2019

(54) METHODS AND SYSTEMS FOR EMBEDDING ONE OR MORE SCANNED PAGES AS OBJECT IN A SCANNED DOCUMENT

(71) Applicant: XEROX CORPORATION, Norwalk, CT (US)

(72) Inventors: Kuldeep Singh, Sonipat (IN); Derine Joy, Ernakulam (IN); Kiran Chiriyankandath Sony, Thrissur (IN); Jinto Vettuvayalil Raju, Kottayam (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/646,404

(22) Filed: Jul. 11, 2017

(65) Prior Publication Data
US 2019/0020782 A1 Jan. 17, 2019

(51) Int. Cl.
*H04N 1/32* (2006.01)

(52) U.S. Cl.
CPC ..... *H04N 1/32267* (2013.01); *H04N 1/32325* (2013.01); *H04N 2201/0094* (2013.01); *H04N 2201/3232* (2013.01); *H04N 2201/3245* (2013.01); *H04N 2201/3277* (2013.01)

(58) Field of Classification Search
None
See application file for complete search history.

(56) References Cited

U.S. PATENT DOCUMENTS

2016/0231964 A1* 8/2016 Oki .................. H04N 1/047
2016/0350269 A1* 12/2016 Nakashima ........ H04N 1/32144

* cited by examiner

*Primary Examiner* — Frantz Bataille (57) ABSTRACT

The present disclosure discloses methods and systems for embedding one or more scanned pages in a scanned document. The method includes receiving a document for scanning, the document includes a plurality of pages. Each page of the document is scanned. Then, a scanned document is created. A user interface is presented to a user to receive one or more page numbers corresponding to one or more scanned pages of the document to be embedded, a page number where the one or more scanned pages are to be embedded, and a location where the one or more scanned pages are to be embedded. Based on the received details, the one or more scanned pages are embedded as object at the page location in the scanned document. A final scanned document is created including the one or more scanned pages as embedded objects and the remaining pages as visible scanned pages.

19 Claims, 6 Drawing Sheets

METHODS AND SYSTEMS FOR EMBEDDING ONE OR MORE SCANNED PAGES AS OBJECT IN A SCANNED DOCUMENT

TECHNICAL FIELD

The presently disclosed embodiments are directed to the field of scanning, and more particularly to methods and systems for embedding one or more scanned pages as object in a scanned document.

BACKGROUND

The use of multi-function devices, printers, scanner, etc., is very common in organizations to fulfil various needs of users. For example, multi-function devices can be used for printing, scanning or the like, while printers can be used only for printing. Scanning is one of the common activities seen in organizations, where a user provides one or more physical documents for scanning. The scanner scans the document and creates a soft copy of the document and sends the soft copy to a desired destination, for example, a server, a pre-defined folder, or via an email. There are situations where the user wants to scan a document but wishes to have one or more pages of the document as embedded objects, i.e., displayed as an icon in the scanned document. The embedded objects/pages can be viewed later when required by the user, for example, by double clicking.

A few solutions are available in the market where a document may be embedded using insert object option as available in the document. But this is done manually by the user and moreover the functionality is not available at the time of scanning and further requires separate tools for embedding. Therefore, there is a need for methods and systems that allow a user to handle documents submitted for scanning as required by the user.

SUMMARY

According to aspects illustrated herein, a method is provided. The method includes receiving a document for scanning, the document includes a plurality of pages, each page is associated with a page number. Each page of the document is scanned. Then, a scanned document is created. A user interface is presented to a user to receive details including one or more page numbers corresponding to one or more scanned pages of the document to be embedded, a page number where the one or more scanned pages are to be embedded, and a location where the one or more scanned pages are to be embedded. Based on the received details, the one or more scanned pages are embedded as object at the page location in the scanned document. A final scanned document is created including the one or more scanned pages as embedded object and the remaining pages as visible scanned pages. The final created scanned document is sent to a destination as specified by the user.

According to aspects illustrated herein, a multi-function device is disclosed. The multi-function device includes a scanner, a user interface and a controller. The scanner is configured for scanning a received document from a user, the document includes a plurality of pages. The user interface is configured for receiving an input from the user in the form of one or more page numbers corresponding to one or more scanned pages to be embedded, a page number where the one or more scanned pages are to be embedded, and a location where the one or more scanned pages are to be embedded. The controller is configured for processing the received input to separate the one or more scanned pages to be embedded from the remaining pages of the scanned document; inserting the one or more scanned pages as object at the page location in the scanned document; creating a final scanned document including the one or more scanned pages as embedded object and the remaining pages as visible scanned pages; and sending the final scanned document to a destination as specified by the user.

According to additional aspects illustrated herein, a method is disclosed. The method includes receiving a document for scanning from a user, the document includes a plurality of pages, where each page is associated with a page number. Each page of the document is scanned. Each scanned page of the document is stored in a memory. An input from the user is received in the form of one or more scanned pages to be embedded, a page where the one or more scanned pages are to be embedded and a location where the one or more scanned pages are to be embedded. Based on the input from the user, the one or more scanned pages to be embedded in the scanned document are identified. The one or more identified scanned pages to be embedded are separated from the scanned document. Then, a first document containing the remaining scanned pages of the scanned document is created, wherein the page location belongs to the first document. Thereafter, a second document containing the one or more scanned pages to be embedded as object is created. The second document is inserted at the page location belonging to the first document. A final scanned document is created including the second document and the first document, where the second document is shown in the form of an icon and the first document is represented by the remaining scanned pages of the scanned document.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In context of the present disclosure, the multi-function device performs scanning of a document and embeds one or more scanned pages as object in the scanned document and this will be discussed below in more detail. The multi-function device may include a number of components to perform the said functionality and this will be discussed in detail below.

The term "user interface" is defined to include an interface shown on the multi-function device and is operable by the user to perform one or more functions such as change setting, check status, initiate scan, print, fax, print, copy, or any other functions. In context of the current disclosure, the user interface is presented for the user to provide input in the form of one or more scanned pages to be embedded, a page where the one or more scanned pages are to be embedded and a location where the scanned pages are to be embedded.

The "document" refers to a physical or a hard copy of the document.

The "scanned document" refers to an electronic version (or soft copy) of the document received for scanning. Generally, the scanned document includes all pages in visible form or content of all pages is visible for the user. In the context of the current disclosure, the scanned document includes one or more scanned pages as embedded objects and the remaining scanned pages as normal visible scanned pages.

The term "final scanned document" refers to a scanned document where one or more scanned pages are embedded as object and other scanned pages as normal scanned pages. The final scanned document may also be referred to as a compound document.

The term "normal scanned pages" refer to scanned pages where content of each pages is visible. The normal scanned pages may also be referred to as "visible scanned pages." The term "embedded pages" refer to scanned pages that are displayed as an icon and content of the pages is not visible but can be viewed upon performing an action by a user such as clicking.

The term "server" refers to any entity or a device capable of communicating with the multi-function device and further configured for embedding one or more scanned pages in the scanned document.

Overview

Typically, when a user wants to scan a document, the document is provided on a platen for scanning. The document is received by a scanner for scanning, where the scanner scans each page of the document. After scanning, the scanned document is sent to the user in the form of a soft copy. For example, the scanner sends the scanned document to the user to his email or the like. Here the output generated by the scanner includes the same number of pages as submitted by the user for scanning. For example, if the input document includes 6 pages; the output also includes 6 pages in the form of scanned document. But there are situations where the user wants to refer to one or more pages of the document at a later stages. In view of this, the disclosure provides methods and systems for handling documents submitted for scanning where one or more scanned pages are embedded as object in a scanned document.

The primary aim of the disclosure is to create a scanned document such that the scanned document includes (i) one or more scanned pages in the form of an icon, and the remaining scanned pages as normal scanned pages. The scanned pages in the form of an icon may be the pages which a user wishes to refer for later view.

Exemplary Environment

Figure 1:
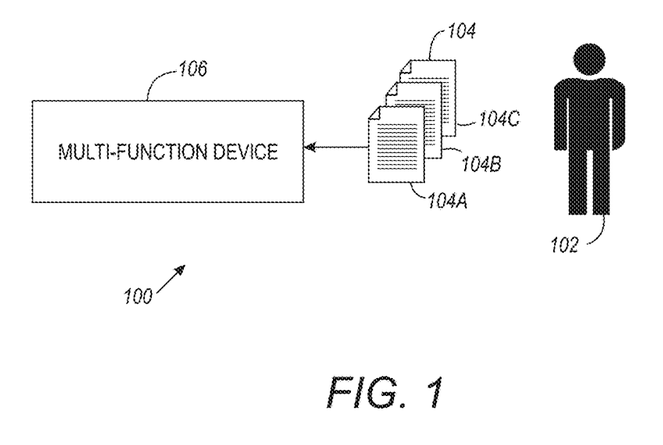
FIG. 1 illustrates an exemplary environment in which various embodiments of the disclosure can be practiced.

FIG. 1 shows an exemplary environment 100 in which various embodiments of the disclosure may be practiced. The environment 100 includes a user 102, a document 104 having a plurality of pages such as 104*a*, 104*b*, and 104*c*, and a multi-function device 106. Typically, the user 102 uses the multi-function device 106 for day to day usage such as printing, scanning, copying, imaging or any other functions. As shown, the user 102 uses the multi-function device 106 for scanning the document 104. The multi-function device 106 scans the document 104 and sends the scanned document to the user 102 to his email or saves the scanned document at a particular location on a server. In particular, the multi-function device 106 receives the document 104 in the form of a hard copy and generates an electronic version of the document. Here, the scanned document includes scanned pages of the document.

But in the context of the current disclosure, the multi-function device 106 creates a scanned document where one or more scanned pages of the scanned document are embedded as object/attachment/file, while the other scanned pages are represented as normal scanned pages. Such scanned document is created based on an input from the user 102. The input includes one or more pages to be embedded, a page where the one or more pages to be embedded and a location on the page where the one or more pages to be embedded. This will be discussed below in more detail. The scanned document as generated by the present disclosure is different from the scanned document of the conventional solutions or art and this is shown in conjunction with FIGS. 5A and 5B.

Figure 5A:
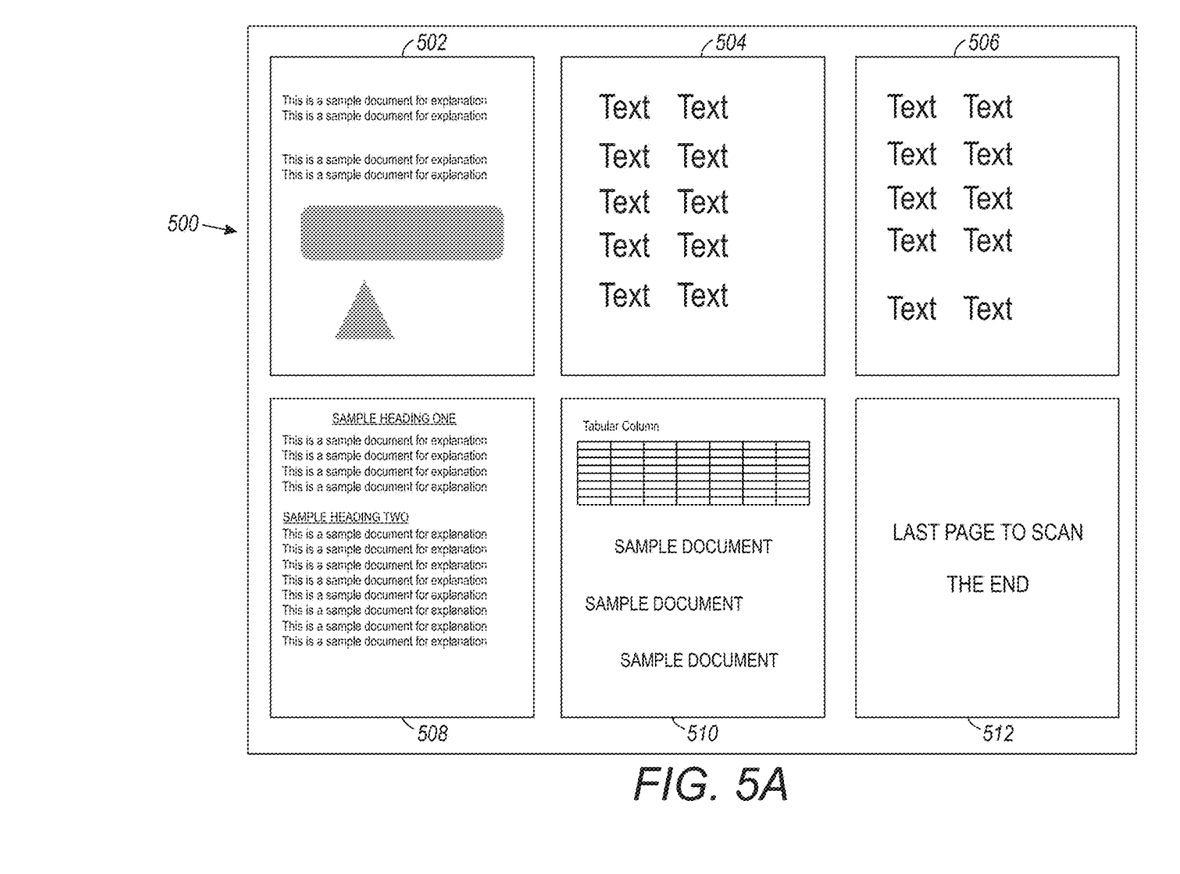
FIGS. 5A and 5B show an input and an output according to the present disclosure.
Figure 5B:
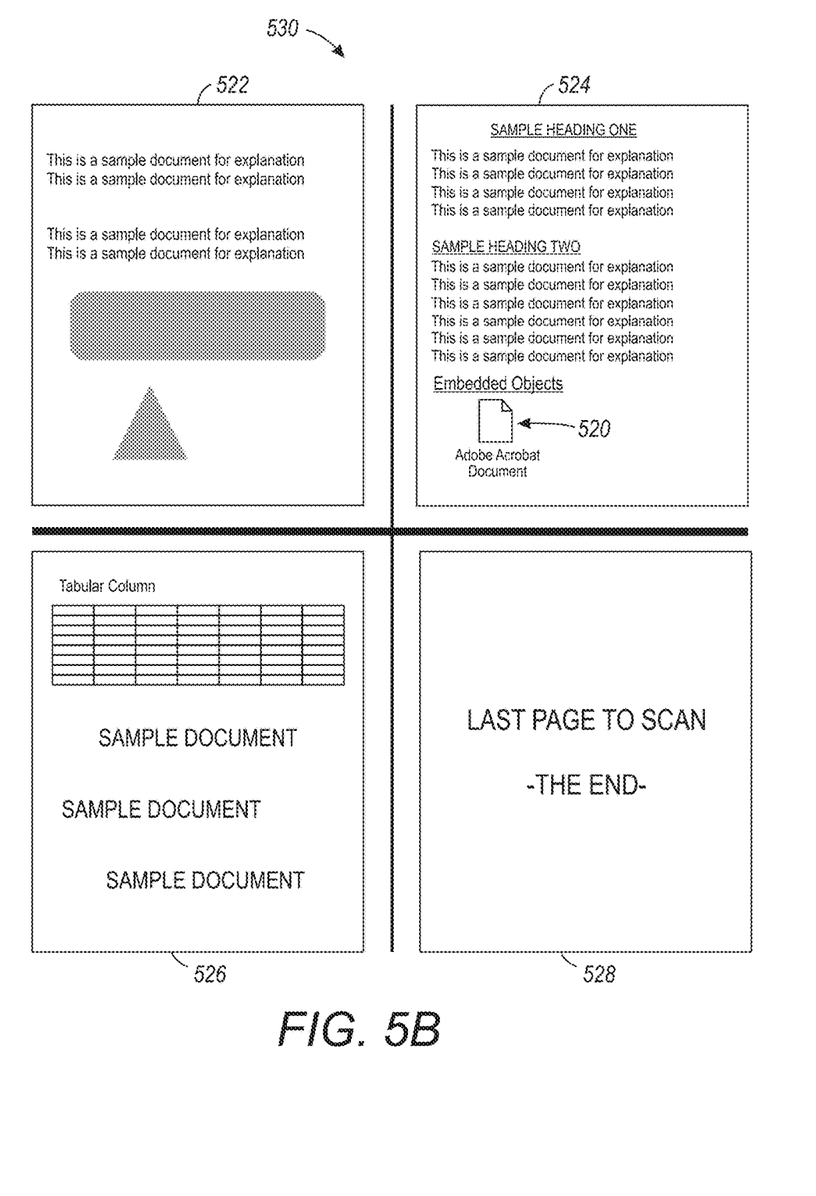

As one example, FIG. 5A shows an input document 500 having six pages marked as 502, 504, 506, 508, 510 and 512. The document 500 is a physical document submitted by a user to the multi-function device 106 for scanning. The user provides an input, i.e., pages 504, 506 to be embedded, a page 508 where the pages 504, 506 to be embedded and a location, i.e., bottom of the page 508. The output generated by the multi-function 106 is a scanned document 530 where the pages 504 and 506 are embedded on the page 508 in the form of an icon as indicated by 520. Upon clicking the icon 520, the pages 504 and 506 can be viewed by the user. As a result, the output generated by the multi-function device 106 includes 4 pages marked as 522, 524, 526 and 528 (refer to FIG. 5B). The pages marked as 522, 524, 526 and 528 represent a first document while 520 marked as a second document. In this manner, the present disclosure generates a compound document 530 where the one or more scanned pages as specified by the user are embedded as object. While the output generated by the conventional solutions include all the six pages 502, 504, 506, 508, 510 and 512 as a part of the scanned document.

Exemplary System

Figure 2:
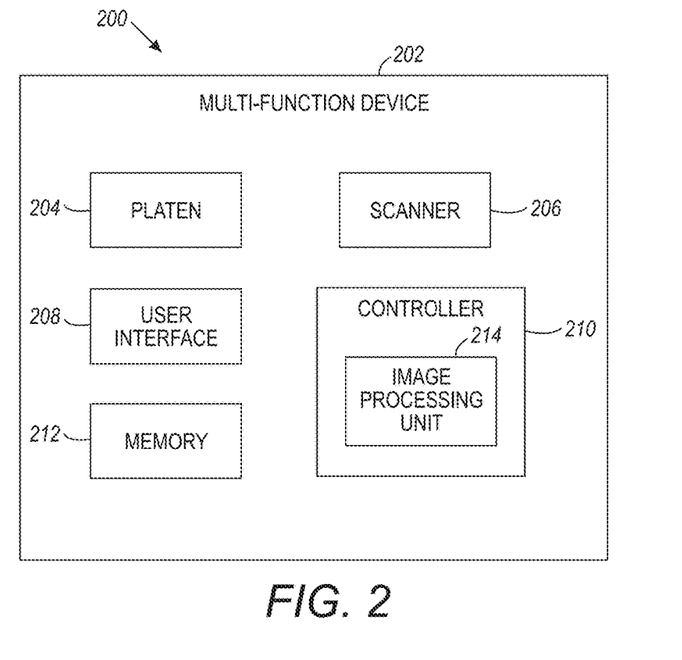
FIG. 2 is an overall system for managing documents for scanning.

FIG. 2 shows an overall system 200 for creating a scanned document, where one or more scanned pages are embedded in the scanned document. References to other figures such as FIG. 1, FIG. 3, FIG. 4, FIGS. 5A and 5B can be made while discussing FIG. 2. As shown, the system 200 includes the multi-function device 202. The multi-function device 202 includes a platen 204, a scanner 206, a user interface 208, a controller 210 having an image processing unit 214, and a memory 212. Each of the components 204, 206, 208, 210, and 212 are coupled to each other via a communication bus or later developed protocols and also each of the components communicate with each other for implementing the current disclosure. The multi-function device 202 may include one or more additional components as required to implement the current disclosure.

The platen 204 receives a document for scanning. The document includes multiples pages. The document may be any type of document such as a booklet, a form, or others. Each page of the document may be associated with a page number. Alternatively, each page may not be associated with a page number. In such cases, the controller 210 assigns a page number to each page of the document in the same order as provided by the user. This can be done at the time of scanning or after scanning is completed.

The scanner 206 scans each page of the document. Upon scanning, image of each page of the document is created. Each page image is stored in the memory 212. Upon completion of scanning, the scanner interacts with the controller 210. The controller 210 presents a user interface 208 to the user.

The user interface 208 is presented to the user to receive an input. The input includes one or more scanned pages of the scanned document to be embedded, a page where the one or more scanned pages to be embedded and a location on the page where the one or more scanned pages are to be embedded. In particular, the input includes one or more page numbers corresponding to the one or more scanned pages to be embedded, a page number of the page where the one or more scanned pages to be embedded and a location on the page where the one or more scanned pages are to be embedded. The location may be top or bottom of the page.

The controller 210 receives the input from the user and passes the received input to the image processing unit 214. Based on the input, the image processing unit 214 processes the received input. The image processing unit 214 identifies the one or more scanned pages from the scanned document and extracts those pages. In this manner, the image processing unit 214 separates the one or more scanned pages to be embedded from the remaining scanned pages of the scanned document. The image processing unit 214 creates a first (or primary) document containing the remaining scanned pages and further creates a second (or secondary) document containing the one or more scanned pages to be embedded as provided by the user. In this manner, the first document and the second document are created. The image processing unit 214 inserts the second document as an object at the page location of the first document as provided by the user. The second document is displayed as an icon in the first document. In this manner, the image processing unit 214 creates the final scanned document. The final scanned document is sent to the user to his email or other ways as known or later developed. The user can view the embedded document (i.e., the second document) at his user device.

The memory 212 stores the scanned document and also stores the final created scanned document for later retrieval.

Exemplary Flowcharts

Figure 3:
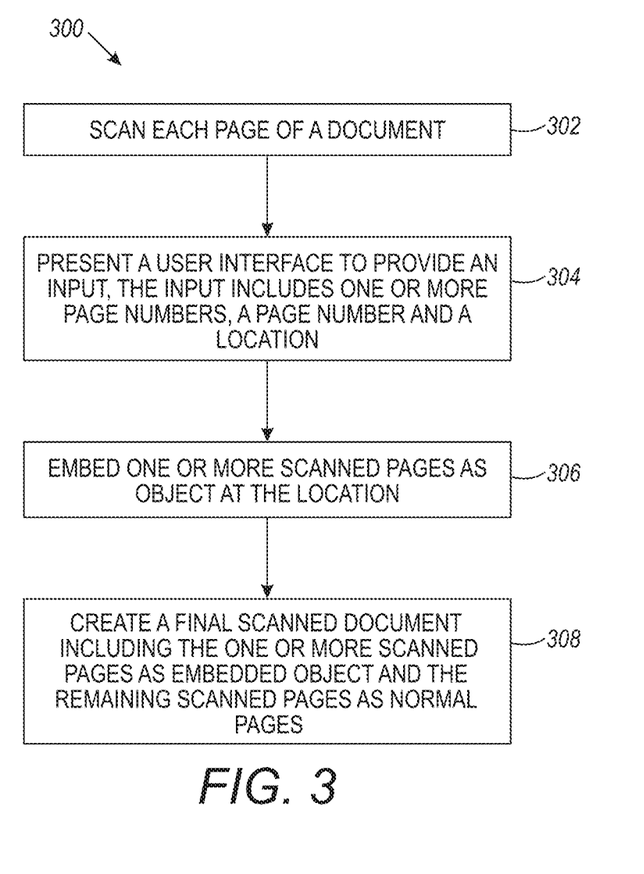
FIG. 3 shows a method flowchart for embedding one or more scanned pages in a scanned document.

FIG. 3 is a method flowchart 300 for embedding one or more pages of a scanned document in the scanned document. The method is discussed where the user wishes to embed one or more scanned pages in the scanned document. Embedding refers to inserting the scanned pages in the scanned document. To this end, the user enables a pre-defined option, the pre-defined option refers to "inserts scanned pages as objects."

The method starts with receiving a document for scanning, the document includes a plurality of pages, where each page is associated with a page number. In cases where page numbers are not associated with the pages, a page number is assigned to each page of the document by the multi-function device while scanning. Upon receiving, at 302, each page of the document is scanned. Each scanned page of the document is stored in a memory. Then, at 304 a user interface is presented to the user to provide an input. The input includes one or more page numbers corresponding to one or more scanned pages that the user wishes to embed, a page number where the one or more scanned pages to be embedded, and a location where the one or more scanned pages are to be embedded. The location may be top or bottom section of the page where the one or more scanned pages are to be embedded. Based on the input, the one or more scanned pages are separated from the scanned document leaving the scanned document with other scanned pages. After separating, the scanned pages left are the remaining scanned pages of the scanned document. At 306, the one or more scanned pages are embedded as an object at the location of the page as specified by the user. The one or more scanned pages are embedded or inserted as object at the page location in the scanned document. The scanned pages to be embedded may be embedded as a single object, while the scanned pages to be embedded may be embedded as an individual object. At 308, a final scanned document is created including the one or more scanned pages as embedded object and the remaining pages as normal scanned pages. The scanned pages embedded as object are displayed in the form of a pre-defined icon such as PDF, MS word, MS ppt, etc., while the remaining scanned pages are displayed as visible scanned pages. Thereafter, the final scanned document is sent to a destination as specified by the user.

Figure 4:
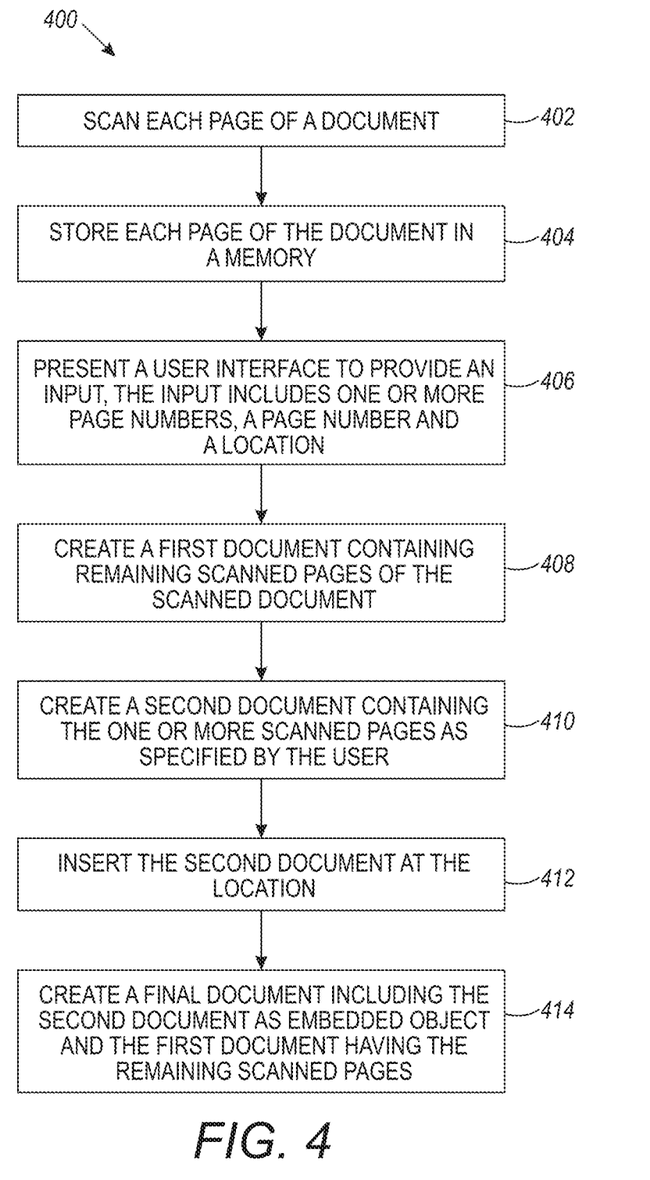
FIG. 4 is a detailed method flowchart for embedding one or more scanned pages as objects in a scanned document.

FIG. 4 is a detailed method flowchart 400 for the present disclosure. The method starts when a user wishes to scan a document and further wants to have one or more pages of the scanned document as object for later view. The method begins where a user provides a document for scanning. The document includes multiple pages. Upon receiving the document, each page of the document is scanned at 402. At 404, each scanned page is stored in a memory, in particular, each scanned page is stored in the form of image in the memory. Then at 406, a user interface is presented to the user to provide an input, the input has three parts: (i) one or more scanned pages to be embedded, (ii) a page where the one or more scanned pages are to be embedded and (iii) a location where the one or more scanned pages are to be embedded. In particular, the input includes one or more page numbers, a page number and a location.

Based on the input from the user, the one or more scanned pages that are to be embedded are identified and are then separated from the scanned document, i.e., from the remaining pages of the scanned document. It is then identified a page where the one or more scanned pages are to be embedded. At 408, a first document containing the remaining scanned pages of the scanned document is created, wherein the page location belongs to the first document. At

410, a second document containing the one or more scanned pages to be embedded as specified by the user is created. At 412, the second document is inserted at the page location belonging to the first document. At 414, a final document is created including the second document as embedded object and the first document having the remaining scanned pages. The embedded object is displayed in the form of an icon. Specifically, the second document is shown in the form of an icon and the first document is represented by the remaining scanned pages of the scanned document. The final scanned document is stored. The final scanned document is sent to a destination as specified by the user. When accessing the final document, the user may view the embedded scanned pages by double clicking, for example. This is just one example, there can be other ways to view the embedded scanned pages. The user views the one or more scanned pages at his device such as a computing device, a mobile phone device, a smart device or the like.

The present disclosure discloses methods and systems for managing scanned documents especially when a user wishes to embed one or more scanned pages of a scanned document in the form of an object inside the scanned document. This eliminates the need of having a separate desktop tool or any other tool for embedding the scanned pages. Further, the concept of embedding the scanned pages helps the user to easily navigate through the scanned document, i.e., the remaining scanned pages and refer to the embedded scanned pages if need be.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "creating," or "scanning," or "storing," or "presenting," or "receiving," "inserting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method comprising:
   receiving a document for scanning, the document includes a plurality of pages, each page is associated with a page number;
   scanning each page of the document;
   creating a scanned document;
   presenting a user interface to a user to receive an input comprising one or more page numbers of one or more scanned pages of the document that are to be embedded as an object in a final scanned document, a page number of a page where the one or more scanned pages are to be embedded as the object, and a location in the page where the one or more scanned pages are to be embedded as the object;
   based on the received input, embedding the one or more scanned pages as the object at the page location in the scanned document;
   creating the final scanned document comprising the one or more scanned pages as the embedded object and the remaining pages as visible scanned pages; and
   sending the final created scanned document to a destination as specified by the user.

2. The method of claim 1, wherein the document is a hard copy.

3. The method of claim 1, further comprising enabling a pre-defined option by the user, wherein the pre-defined option relates to embedding the one or more scanned pages of the document.

4. The method of claim 1, further comprising enabling the user to view the embedded one or more scanned pages at a user device.

5. The method of claim 1, further comprising identifying the one or more scanned pages to be embedded, based on the received input.

6. The method of claim 5, further comprising separating the one or more scanned pages to be embedded from the scanned document.

7. The method of claim 1, further comprising storing the scanned document in a memory.

8. The method of claim 1, further comprising displaying the one or more scanned pages to be embedded, in the form of an icon at the page location.

9. A multi-function device, comprising:
   a scanner configured for:
      scanning a received document from a user, the document comprising a plurality of pages;
   a user interface configured for:
      receiving an input from the user in the form of one or more page numbers of one or more scanned pages of the document that are to be embedded as an object in a final scanned document, a page number of a page where the one or more scanned pages are to be embedded as the object, and a location in the page where the one or more scanned pages are to be embedded as the object; and
   a controller configured for:
      processing the received input to separate the one or more scanned pages to be embedded from the remaining pages of the scanned document;
      inserting the one or more scanned pages as the object at the page location in the scanned document;
      creating the final scanned document including the one or more scanned pages as the embedded object and the remaining pages as visible scanned pages; and
      sending the final scanned document to a destination as specified by the user.

10. The multi-function device of claim 9, further comprising a memory for storing the scanned document and the final scanned document.

11. The multi-function device of claim 10, wherein the controller is configured for displaying the embedded object in the form of an icon.

12. A method, comprising:
   receiving a document for scanning from a user, the document comprising a plurality of pages, wherein each page is associated with a page number;
   scanning each page of the document;
   storing each scanned page of the document in a memory;
   receiving an input from the user in the form of one or more scanned pages that are to be embedded as an object, a page where the one or more scanned pages are to be embedded as the object, and a location in the page where the one or more scanned pages are to be embedded as the object;
   based on the input from the user, identifying the one or more scanned pages to be embedded in the scanned document;
   separating the one or more identified scanned pages to be embedded, from the scanned document;

creating a first document containing the remaining scanned pages of the scanned document, wherein the location belongs to the first document;

creating a second document containing the one or more scanned pages to be embedded;

inserting the second document at the location belonging to the first document; and creating a final scanned document including the first document and the second document, wherein the second document is shown in the form of an icon and the first document is represented by the remaining scanned pages of the scanned document.

13. The method of claim 12, further comprising sending the final scanned document to a destination as specified by the user.

14. The method of claim 12, further comprising storing the final scanned document.

15. The method of claim 12, wherein storing comprises storing image of each page of the scanned document.

16. The method of claim 12, further comprising identifying the page where the one or more scanned pages are to be embedded as specified by the user.

17. The method of claim 16, wherein the location comprises one of a top section and a bottom section of the identified page.

18. The method of claim 12, further comprising enabling the user to view the one or more embedded scanned pages at a device.

19. The method of claim 12, wherein the received document corresponds to a hard copy.

* * * * *